United States Patent
Yamada et al.

(10) Patent No.: US 6,753,938 B2
(45) Date of Patent: Jun. 22, 2004

(54) LIQUID CRYSTAL DISPLAY DEVICE USING BOTH REFLECTION AND TRANSMISSION

(75) Inventors: Yoshitaka Yamada, Kumagaya (JP); Yasuyuki Hanazawa, Fukaya (JP); Masaki Kinoshita, Saku (JP); Akio Murayama, Fukaya (JP); Yasuharu Tanaka, Fukaya (JP); Ryoichi Watanabe, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 196 days.

(21) Appl. No.: 09/946,365

(22) Filed: Sep. 6, 2001

(65) Prior Publication Data

US 2002/0027627 A1 Mar. 7, 2002

(30) Foreign Application Priority Data

Sep. 6, 2000 (JP) .......................... 2000-270480

(51) Int. Cl.[7] ................ G02F 1/1335; G02F 1/1333
(52) U.S. Cl. ................. 349/113; 349/119; 349/138; 349/106; 439/30
(58) Field of Search .................. 349/113, 106, 349/119, 138; 439/30

(56) References Cited

U.S. PATENT DOCUMENTS

| | | | | |
|---|---|---|---|---|
| 6,295,109 B1 | * | 9/2001 | Kubo et al. | 349/119 |
| 6,376,271 B1 | * | 4/2002 | Sawayama et al. | 439/30 |
| 6,380,995 B1 | * | 4/2002 | Kim | 349/113 |
| 2001/0024257 A1 | * | 9/2001 | Kubo et al. | 349/138 |
| 2002/0036730 A1 | * | 3/2002 | Back et al. | 349/106 |

* cited by examiner

Primary Examiner—Julie-Huyen L. Ngo
(74) Attorney, Agent, or Firm—Pillsbury Winthrop LLP

(57) ABSTRACT

A liquid crystal display device comprises an array substrate including a plurality of pixel electrodes, a counter substrate including a counter electrode facing the pixel electrodes, and a liquid crystal layer which modulates reflected and transmitted light of each pixel held between the substrates and defined by a corresponding pixel electrode. In particular, each pixel electrode has a conductive light reflective layer which reflects incident light and at least one opening which is formed as a missing portion of the conductive light reflective film to transmit incident light.

11 Claims, 4 Drawing Sheets w/d=0.5 w/d=2

LIQUID CRYSTAL DISPLAY DEVICE USING BOTH REFLECTION AND TRANSMISSION

CROSS-REFERENCE TO RELATED APPLICATIONS

This application is based upon and claims the benefit of priority from the prior Japanese Patent Application No. 2000-270480, filed Sep. 6, 2000, the entire contents of which are incorporated herein by reference.

BACKGROUND OF THE INVENTION

1. Field of the Invention

The present invention relates to a liquid crystal display device for displaying an image in a combination manner of light reflection and light transmission.

2. Description of the Related Art

Conventionally, a display device for a portable terminal such as a mobile phone, pocket pager or the like, has been used for the purpose of displaying simple characters such as numerals, characters or the like. With the recent remarkable progress in the information technology, a small, light and thin display device capable of displaying a high-resolution color image at low power consumption is required for the portable terminal.

Active matrix liquid crystal display devices of a reflection type, for example, are regarded as those which are most likely to comply with such a requirement. Some of the display devices have been brought into practical use. Such a display device can display a clear image in daylight, without requiring an internal light source. However, when the image is displayed in the darkness of night, it can hardly be recognized. Thus, the use of the display device tends to be limited by its environment.

As a countermeasure for the problem, a front light technique has been proposed. In this technique, a display surface of the reflection-type liquid crystal display device is covered with a transparent plane light source which supplements an illuminance of an external light. The plane light source does not require any modification of the internal structure of the liquid crystal display device, but it causes a decreased luminance of the reflected light, a blur of the image, an increased depth of the image, or the like which impairs the image quality.

Under the circumstance described above, Jpn. Pat. Appln. KOKAI Publication No. 11-316382 discloses a liquid crystal display device which displays an image in a combination manner of light reflection and light transmission. In this liquid crystal display device, each pixel electrode is configured in a combination of a conductive light reflective film and a conductive light transmissive film. The conductive light reflective film reflects external light so that the image can be displayed in a light reflection manner under a high-illumination environment such as outdoors in daylight, and the conductive light transmissive film transmits a light from a backlight so that the image can be displayed in a light transmission manner under a low-illumination environment such as the darkness of night.

However, individual processes are used for forming the light reflective and light transmissive films of predetermined patterns. This causes a decrease in the manufacturing yield and an increase in the manufacturing costs. In addition, there is another problem that a bright image can hardly be obtained since the reflection efficiency is lowered due to an overlap of the light reflective film and the light transmissive film.

BRIEF SUMMARY OF THE INVENTION

An object of the present invention is to provide a liquid crystal display device which can prevent the reflection efficiency from being lowered without requiring complicated manufacturing processes.

According to the invention, there is provided a liquid crystal display device which displays an image in a combination manner of light reflection and light transmission, the device comprising: a first electrode substrate including a plurality of pixel electrodes; a second electrode substrate including a counter electrode facing the plurality of pixel electrodes; and a liquid crystal layer held between the first and second electrode substrates, for modulating reflected light and transmitted light for pixels each defined by a corresponding pixel electrode, wherein each pixel electrode includes a conductive light reflective film for reflecting incident light and at least one opening formed as a missing portion of the conductive light reflective for transmitting incident light.

In the liquid crystal display device, each pixel electrode includes a conductive light reflective film for reflecting incident light and at least one opening formed as a missing portion of the conductive light reflective film for transmitting incident light. Since the opening can be obtained together with the conductive light reflective film by a patterning process of forming the conductive light reflective film into a predetermined pattern, no complicated manufacturing process is required. Furthermore, since the opening allows transmission of incident light, there is no need to provide a conductive light transmissive film such as an indium tin oxide (ITO) which overlaps the conductive light reflective film and decreases the reflection efficiency. Hence, the liquid crystal display device can display a brighter high-resolution image in combination of reflected light and transmitted light. Furthermore, the device can be manufactured at a low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

An active matrix liquid crystal display device according to an embodiment of the invention will be described with reference to FIGS. 1 and 2 hereinafter. The liquid crystal display device is used for displaying a color image in a combination manner of light reflection and light transmission. The color image is displayed in resolution of VGA× RGB on a screen having a diagonal length of about 10 cm.

Figure 1:
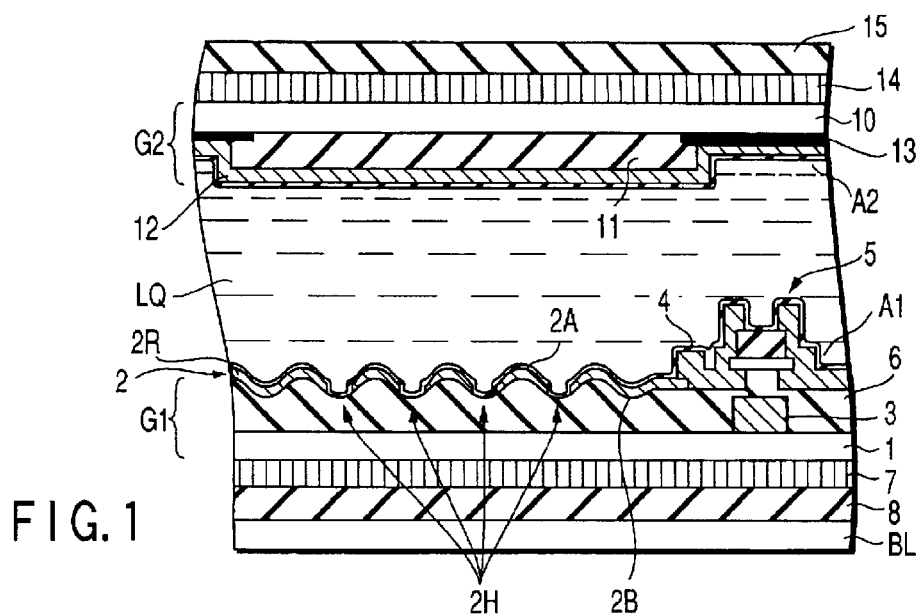
FIG. 1 is a view showing a sectional structure of an active matrix liquid crystal display device according to an embodiment of the invention.
Figure 2:
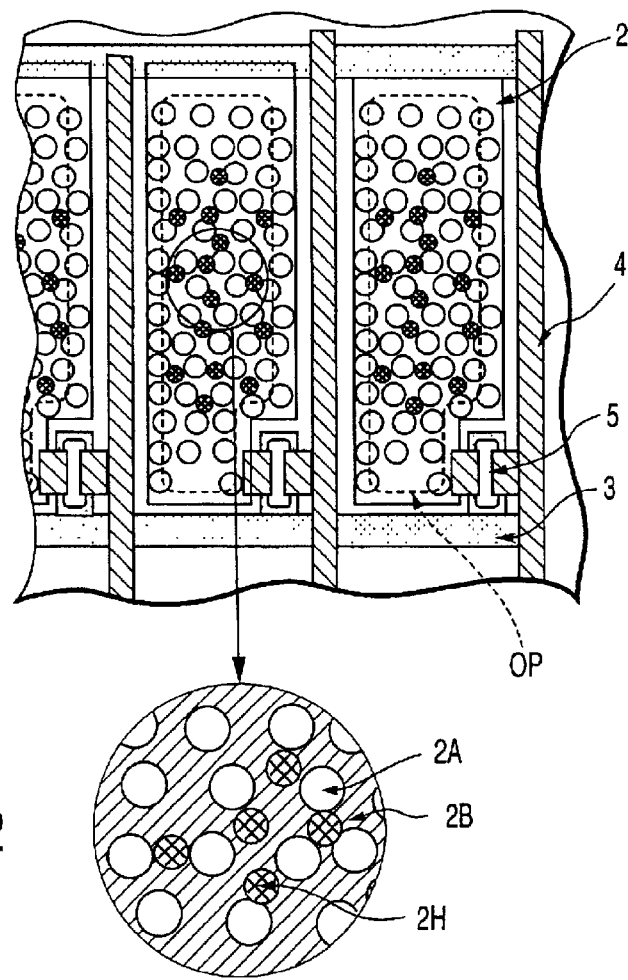
FIG. 2 is a view showing a plane structure of the liquid crystal display device shown in FIG. 1.

FIG. 1 shows a sectional structure of the liquid crystal display device. FIG. 2 shows a plane structure of the liquid crystal display device. The liquid crystal display device comprises electrode substrates G1 and G2, and a liquid crystal layer LQ held between the electrode substrates G1 and G2. The liquid crystal layer LQ is formed of a liquid crystal material which contains nematic liquid crystals having an anisotropic refractive index $\Delta n \approx 0.08$ and relative dielectric constant $\epsilon/\epsilon_0 \approx +8$. The liquid crystal material is surrounded by a peripheral sealing member in a space between the electrode substrates G1 and G2. The electrode substrates G1 and G2 are integrated with the liquid crystal layer LQ by adhesion of the peripheral sealing member.

The electrode substrate G1 includes a light transmissive insulating substrate 1 such as a glass plate, a matrix array of pixel electrodes 2 each for applying to the liquid crystal layer LQ an electric field for controlling the orientations of liquid crystal molecules constituting a pixel, a plurality of scanning lines 3 disposed along rows of the pixel electrodes 2, a plurality of signal lines 4 disposed along columns of the pixel electrodes 2, a plurality of thin-film transistors 5 disposed near the intersections of the scanning lines 3 and the signal lines 4 as switching elements, and an alignment film A1 covering the matrix array of pixel electrodes 2. Each thin-film transistor 5 includes a gate connected to a corresponding scanning line 3, a source connected to a corresponding pixel electrode 2, and a drain connected to a corresponding signal line 4. The plurality of scanning lines 3 are formed on the insulating substrate 1, and the scanning lines 3 and the insulating substrate 1 are covered by a light transmissive interlayer insulating film 6. The plurality of pixel electrodes 2, signal lines 4 and thin-film transistors 5 are formed on the insulating film 6. Each pixel electrode 2 has a conductive light reflective film 2R for reflecting incident light and at least one opening 2H formed as a missing portion of the conductive light reflective film 2R for transmitting incident light. In this embodiment, the interlayer insulating film 6 has a transparent undulating resin surface, and the plurality of pixel electrodes 2 is formed together with at least one opening 2H by patterning the conductive light reflective film 2R which has a thickness of 0.2 μm and is formed on the transparent resin surface of the insulating film 6, using a predetermined mask pattern. The conductive light reflective film 2R has undulation of about 1 μm according to the transparent resin surface of the insulating film 6, thereby diffusing reflected light. In FIGS. 1 and 2, 2A denotes a bump portion of the conductive light reflective film 2R, and 2B denotes a dent portion of the conductive light reflective film 2R. The size of a pixel, which is defined by each pixel electrode 2, is 40 μm wide and 100 μm long. In this case, fifteen openings 2H, for example, are positioned at random mainly in the dent portion 2B of the conductive light reflective film 2R. Each opening 2H has a circular shape of 4 μm in diameter. The area of all the openings 2H is set to occupy about 5% of that of each pixel electrode 2 at the maximum. Thus, a decrease in the area ratio of the conductive light reflective film 2R to the pixel electrode 2 is as small so as to be substantially ignored.

The electrode substrate G2 includes a light transmissive insulating substrate 10 such as a glass plate, a color filter 11 formed on the insulating substrate 10, a light transmissive counter electrode 12 formed on the color filter 11 to face the matrix array of pixel electrodes 2, and an alignment film A2 covering the light transmissive counter electrode 12. The color filter 11 includes coloring layers of three colors, red (R), green (G) and blue (B). The coloring layers are formed to face the pixel electrodes 2, and surrounded by a light shielding layer 13 which is formed on the insulating substrate 10 as a black matrix aligned to a gap between the pixel electrodes 2 and defining openings OP. The alignment films A1 and A2 of the electrode substrates G1 and G2 are subjected to alignment treatment such that the alignments of the liquid crystal molecules of the liquid crystal layer LQ are set at a twist angle of about 70 degrees.

The liquid crystal layer LQ has a cell gap d1 set within the range of 2 μm to 5 μm between the electrode substrates G1 and G2 in a light reflective region corresponding to the conductive light reflective film 2R. A ratio w/d of the diameter w of the opening 2H to the cell gap d1 is set within the range of 0.1 to 3. The liquid crystal layer LQ further has a cell gap d2 set to be thicker by 0.1 μm or above than the cell gap d1 between the electrode substrates G1 and G2 in a light transmissive region corresponding to the openings 2H. The cell gap d1 is set, in fact, at 3 μm on average so as to nearly maximize a reflection factor of the light reflective region on the assumption that a retardation value $\Delta n \cdot d1$ is about 240 nm. The cell gap d2 is set, in fact, at 3.7 μm on average as the sum of the thickness (=0.2 μm) of the light reflective film 2R, the half ($\approx$0.5 μm) of the undulation of the light reflective film 2R, and the cell gap d1 (=3 μm). Note that the electrodes G1 and G2 are arranged not to block off the light transmitted through each opening 2H by a non-transparent member such as metallic wirings or the like.

The liquid crystal display device further comprises a ¼-retardation plate 7 fixed to the back surface of the insulating substrate 1, a polarization plate 8 adhered to the ¼-retardation plate 7, a ¼-retardation plate 14 fixed to the back surface of the insulating substrate 10, a polarization plate 15 adhered to the ¼-retardation plate 14, and a backlight BL arranged such that light is diffused into the entire polarization plate 8. The backlight BL has a luminance of about 1,000 candelas per square meter.

The operational principle of the above-described liquid crystal display device will be explained.

As the opening 2H does not have conductivity for serving as an electrode, it seems as if the orientations of the liquid crystal molecules are not controllable within the light transmissive region corresponding to the openings 2H. However, the orientations of the liquid crystal molecules are, in fact, controllable by an electric field applied from an edge of the conductive light reflective film 2R surrounding the opening 2H, in accordance with the signal voltage Vsig. The potential of the conductive light reflective film 2R leaks from the edge to the side of the liquid crystal layer LQ and to the rear side of the electrode substrate G1. Accordingly, the sum of a leakage potential V1 to the side of the liquid crystal layer LQ and a leakage potential V2 to the rear side of the electrode substrate G1 is substantially equal to the signal voltage Vsig (V1+V2≈Vsig).

When the leakage potential V2 to the rear side of the electrode substrate G1 is small enough (V2≈0), the leakage potential V1 to the side of the liquid crystal layer LQ is substantially equal to the signal voltage Vsig (V1≈Vsig). Thus, it is possible to control the orientations of the liquid crystal molecules by using the leakage potential V1.

Inventors of this application made a study of a potential distribution between the pixel electrode 2 and the counter electrode 12 in the liquid crystal layer LQ by computer simulation. As a result, it has been found that the relation between the leakage potentials V1 and V2 depends greatly on the ratio w/d of the minimum width w of the opening 2H to a cell gap d.

Figure 7:
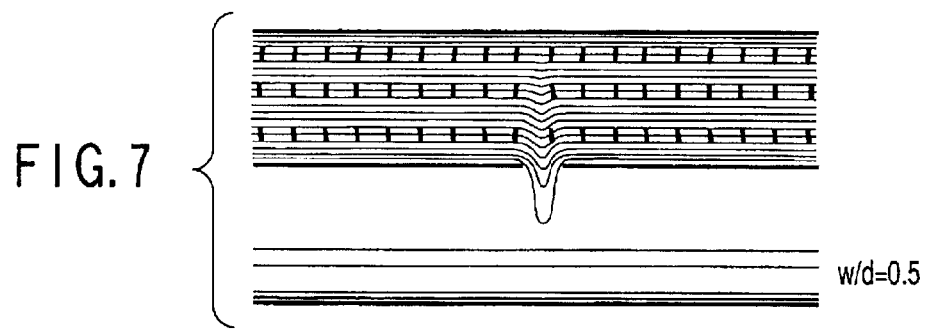
FIG. 7 is a view showing a distribution of leakage potential caused by a narrow opening formed in a pixel electrode of the liquid crystal display device shown in FIG. 1.
Figure 8:
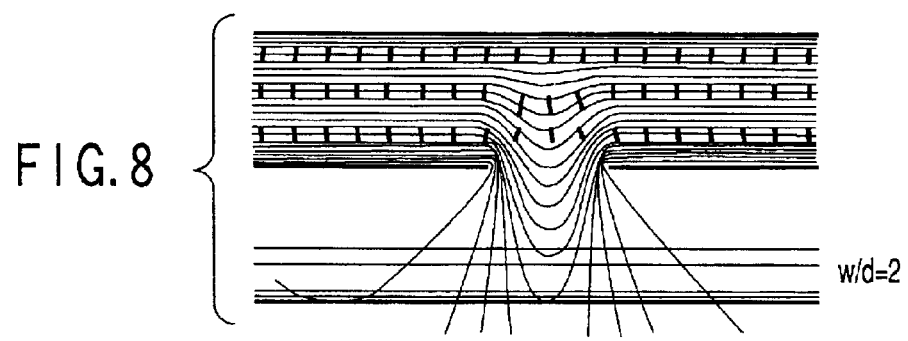
FIG. 8 is a view showing a distribution of leakage potential caused by a wide opening formed in a pixel electrode of the liquid crystal display device shown in FIG. 1.

More specifically, it has been verified that, when the w/d is equal to 1 or less as shown in FIG. 7, it can be considered that the leakage potential V2 is very small, and thus the leakage potential V1 is substantially equal to the signal voltage Vsig (V1≈Vsig). An increase in the leakage potential V2 is accelerated in response to an increment of the w/d, resulting that V1<<Vsig. For practical use, it is confirmed that when the w/d is equal to 3 or less as shown in FIG. 8, the orientations of the liquid crystal molecules are responsive to a change in the electric field in substantially all of the light transmissive region corresponding to the openings 2H.

In a case where Vsig=4V, d=3 μm, and w=4 μm, for example, it is obtained as a result of a simulation using w/d=1.3 that the leakage potential V1≈3V. Thus, the orientations of the liquid crystal molecules are controllable. However, if the width w is decreased up to a submicron order, the diffraction effect of visible light becomes apparent. As a result, a sufficient light transmittance cannot be obtained. Therefore, it is not appropriate to decrease the width w up to the submicron order.

According to the study conducted by the inventors, it is preferable that the w/d is set in a range of 0.1 to 3 when the cell gap d is in a range of 2 μm to 5 μm.

Furthermore, the inventors made a study of a shape of the opening 2H. An outgoing luminance in the light transmissive region is in proportion to the product L×T of the luminance L of the backlight BL multiplied by the transmittance T of the liquid crystal layer LQ. The transmittance T is in proportion to the total area of the openings 2H in each pixel electrode 2. When a single opening 2H is provided on the pixel electrode 2 and the light transmissive region is defined by an area S0 of this opening 2H, it may be considered that the area S0 is insufficient for the total area S1 necessary for one pixel since the area S0 is determined based on the above-described limitation on w/d. For this reason, a required number of openings 2H should be provided to attain the total area S1. In a case where the opening 2H is formed into a circular shape, although there is a merit that a loss of potential at the opening 2H is small, the light transmissive region is not easily determined due to spatial limitations. To the contrary, in a case where the opening 2H is formed into a slit shape, the potential loss becomes slightly larger due to the leakage potential V2 to the rear side of the electrode substrate G1. However, the spatial liminations in determination of the light transmissive region are not serious in comparison with the case of circler shaped opening 2H. Therefore, it is preferable that selection of the circular and slit shapes is made in view of the difference between their characteristics.

Figure 3:
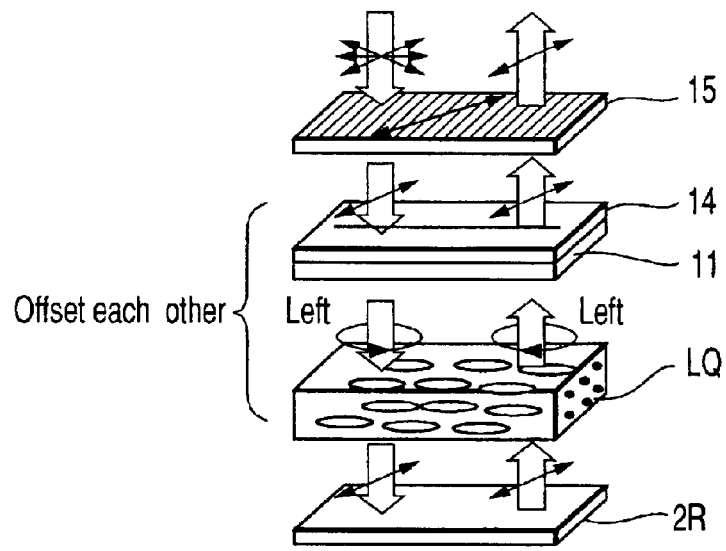
FIG. 3 is a view showing a light reflective region set to a bright display state in the liquid crystal display device shown in FIG. 1.
Figure 4:
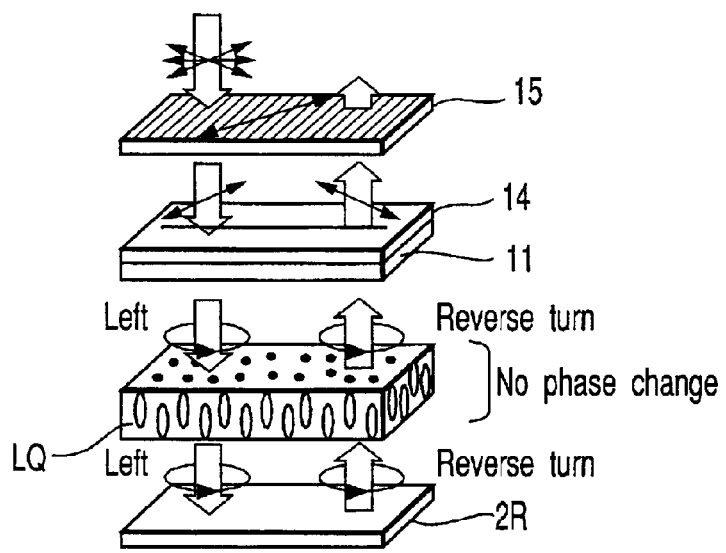
FIG. 4 is a view showing a light reflective region set to a dark display state in the liquid crystal display device shown in FIG. 1.
Figures 5, 6:
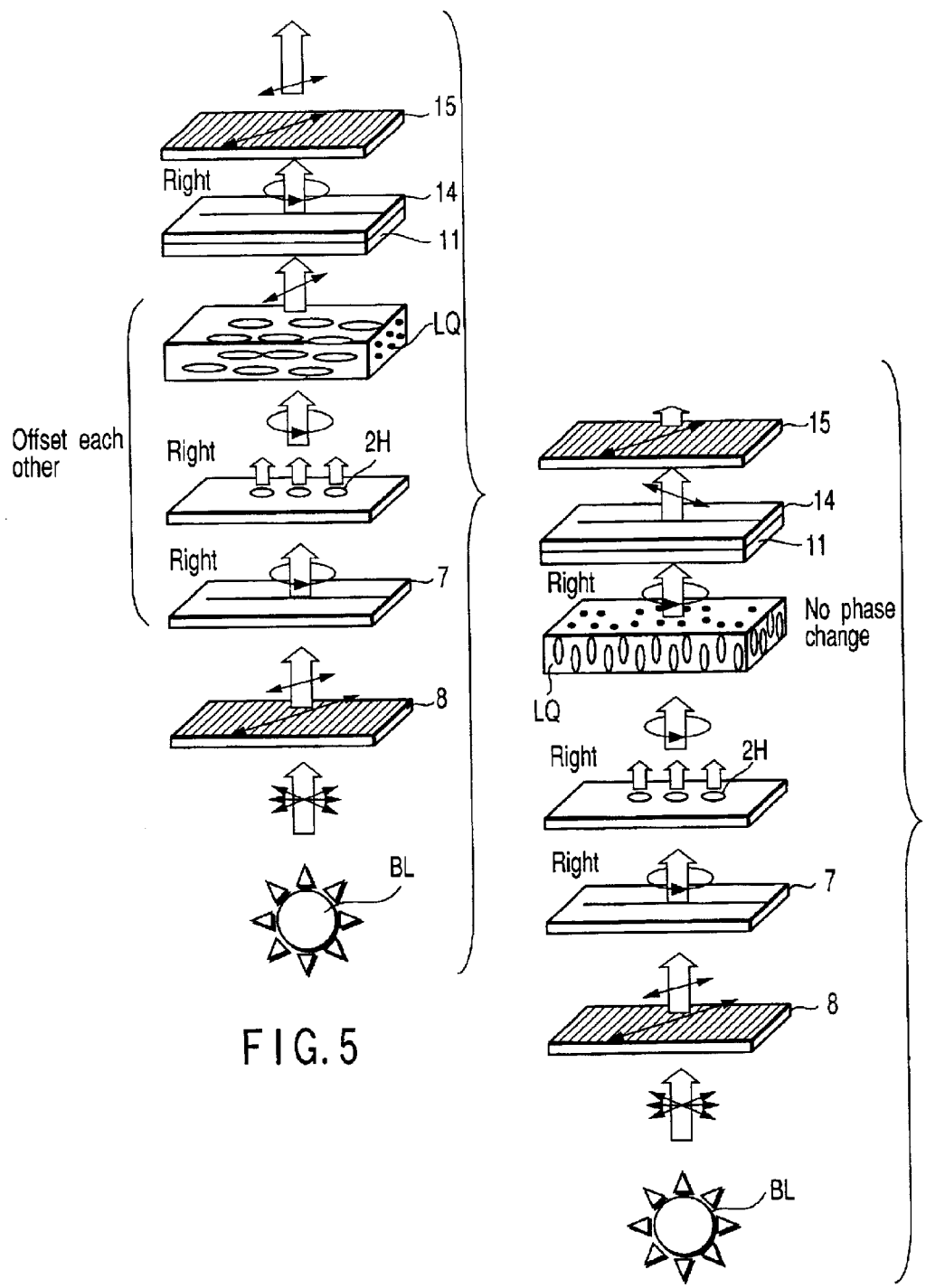
FIG. 5 is a view showing a light transmissive region set to a bright display state in the liquid crystal display device shown in FIG. 1.
FIG. 6 is a view showing a light transmissive region set to a dark display state in the liquid crystal display device shown in FIG. 1.

The liquid crystal display device performs optical switching shown in FIGS. 3 and 4 in the light reflective region corresponding to the conductive light reflective film 2R, and optical switching shown in FIGS. 5 and 6 in the light transmissive region corresponding to the openings 2H. In these cases, it is preferable, in fact, that the polarities of the image signal voltage Vsig used for bright and dark display states are common to the light reflective region and the light transmissive region.

FIG. 3 shows the light reflective region in a bright display state, and FIG. 4 shows the light reflective region in a dark display state. In the light reflective region, a normally white display mode is attained by a light reflection system having a combination of the polarization plate 15, the ¼-retardation plate 14, and the liquid crystal layer LQ of a twisted-nematic liquid crystal type. More specifically, when no voltage is applied, the nematic liquid crystal molecules are set into a twisted alignment and serves as a ¼-retardation plate associated with the polarization plate 15 and the ¼-retardation plate 14 to set the light reflective region into a bright display state (shown in FIG. 3). To the contrary, when the voltage is applied, the liquid crystal molecules are tilted vertically and do not serve as the ¼-retardation plate. Thus, the polarization plate 15 blocks off the reflected light to set the light reflective region becomes into a dark display state (shown in FIG. 4).

FIG. 5 shows the light transmissive region in a bright display state, and FIG. 6 shows the light transmissive region in a dark display state. In the light reflective region, a normally white display mode is attained by a light reflection system, which is substantially the same as that in the light reflective region. The system has a combination of the polarization plate 15, the ¼-retardation plate 14, the polarization plate 8, the ¼-retardation plate 7, and the liquid crystal layer LQ having a twisted-nematic liquid crystal type. The relationship of an angle between a polarization axis of the polarization plate 15 and a retardation axis of the ¼-retardation plate 14 is arranged to have relatively the same relationship of an angle between a polarization axis of the polarization plate 8 and a retardation axis of the ¼-retardation plate 7. More specifically, light from the backlight BL becomes into a substantially circular polarization state after passing though the polarization plate 8 and the ¼-retardation plate 7, and then enters to the openings 2H. When no voltage is applied, the nematic liquid crystal molecules are set into a twisted alignment and serves as a ¼-retardation plate. By this, the light is converted from the circular polarization state into a linear polarization state, and further, is turned into the circular polarization state again by the ¼-retardation plate 14. Then, the intensity of the light passing through the linear polarization plate 15 becomes into about half thereof, so that the light transmissive region is turned into the bright display state shown in FIG. 5. To the contrary, when the voltage is applied, the liquid crystal molecules are tilted vertically and do not serve as the ¼-retardation plate. Thus, the light from the polarization plate 8 is converted from the linear polarity state into the circular polarization state by the ¼-retardation plate 7, and converted into the linear polarization state again by the ¼-retardation plate 14. The axis of the linearly polarized light is perpendicular to the polarization axis of the polarization plate 15, so that the light transmissive region is turned into the dark display state shown in FIG. 6.

In this manner, the normally white display mode is attained in the light reflective region and the light transmissive region. In addition, the cell gap d2 in the light transmissive region is set larger than the cell gap d1 in the light reflective region. The reason for this setting is that incident light in the liquid crystal layer LQ passes through the reflective region twice and the light transmissive region once, and thus, the retardation value required for brightest light in the light transmissive region is twice as many as that in the light reflective region. As a result, the cell gap d2 is necessarily about twice that of the cell gap d1 in this structure.

According to the liquid crystal display device of the embodiment, the reflection factor of the liquid crystal layer LQ equivalent to about 10% of the luminance and the contrast ratio of 20 have been obtained in the light reflective region. This shows substantially the same optical performance as a conventional active matrix liquid crystal display device of reflection-type, which does not use the openings 2H. On the other hand, the transmittance of the liquid crystal layer LQ equivalent to about 1% of the luminance has been obtained in the light reflective region. With a use of the backlight BL whose luminance is about 1,000 candelas per square meter, about 10 candelas per square meter has been obtained as the display luminance. At this time, the contrast ratio has been about 10.

Figure 9:
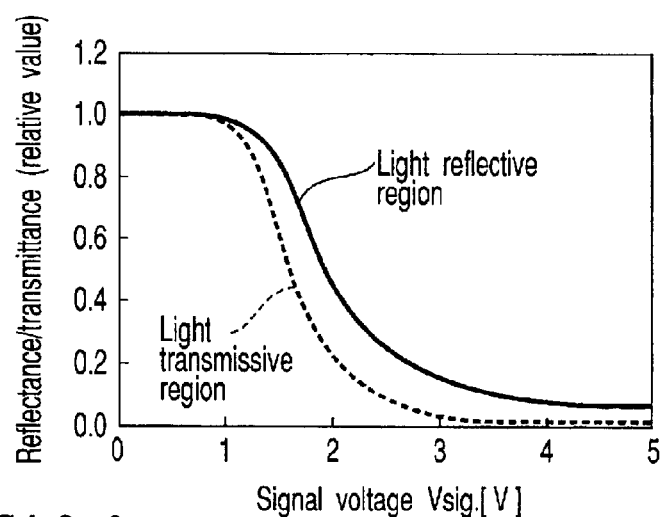
FIG. 9 is a view showing a voltage response property obtained in a display operation of the liquid crystal display device shown in FIG. 1.

FIG. 9 shows a voltage response property in a display operation of the liquid crystal display device. As shown in FIG. 6, both the light reflective region and the light transmissive region are in the normally white display mode, and the voltage response curves thereof are similar to each other. Therefore, substantially the same gradation characteristics can be obtained for the same signal voltage Vsig in each of the light reflective region and the light transmissive region.

Regarding the structure of the liquid crystal display device, the openings 2H can be obtained together with the light reflective film 2R by a patterning process of forming the light reflective film 2R into a predetermined pattern. Thus, a complicated manufacturing process is not required. Furthermore, the openings 2H allows transmission of incident light. Thus, it is not necessary to provide a conductive light transmissive film which overlaps the conductive light reflective film 2R and lowers the reflection efficiency. Hence, the liquid crystal display device can display a high brightness and resolution image by a combination of reflected light and transmitted light, moreover, can be manufactured at the low cost.

Note that the light transmissive region, for example, is used for providing a supplemental light mainly required in a case where the illuminance of the external light is low. Therefore, the display luminance is set not too bright. The display luminance can be modified to an adaptable value to an arbitrary use environment by changing the luminance of the backlight BL, the number and area of openings 2H, or the like.

In addition, it is preferable that the ¼-retardation plates 7 and 14 should be arranged to a double-layered structure of ¼-retardation plate and ½ retardation plate. However, if the plates can function as ¼-retardation plates properly, it does not necessarily employ the double-layered ones.

The openings 2H may be formed into any other shapes other than the circular or slit one as long as the openings are not covered with the conductive light transmissive layer or the like. The openings 2H are arranged irregularly so as to prevent interferences, which occur in a regular array of the openings 2H. However, the arrangement of the openings 2H is not limited to irregular one. Furthermore, the openings 2H are arranged at dent portions 2B of the conductive light reflective film 2R so as to avoid increasing the processes and enlarge the light transmittance of the light transmissive region as much as possible, however, it is not necessarily to limited to this arrangement. To the contrary, the invention is applicable to the case where the cell gap d1 is enlarged by changing the processes so as to optimize the transmittance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device which displays an image in a combination manner of light reflection and light transmission, said device comprising:
    a first electrode substrate including a plurality of pixel electrodes;
    a second electrode substrate including a counter electrode facing the plurality of pixel electrodes; and
    a liquid crystal layer which is held between said first and second electrode substrates, and modulates reflected light and transmitted light for pixels each defined by a corresponding pixel electrode; each pixel electrode including a conductive light reflective film which reflects incident light and at least one opening which is formed as a missing portion of said conductive light reflective and transmits incident light, and orientations of liquid crystal molecules in a light transmissive region corresponding to said opening being controlled by an electric field applied from an edge of said conductive light reflective film surrounding said opening,
    wherein said liquid crystal layer has a first cell gap set in a range of 2 μm to 5 μm by said first and second electrode substrates in a light reflective region corresponding to said conductive light reflective film, and a ratio of the dimension of said opening to the first cell gap is set in a range of 0.1 to 3.

2. The device according to claim 1, wherein a dimension of said opening is determined based on circumstances between the first and second electrode substrates such that the orientations of said liquid crystal molecules are responsive to a change of the electric field in substantially the entire light transmission region.

3. The device according to claim 1, wherein said opening has a slit shape.

4. The device according to claim 1, wherein said opening has a circular shape.

5. The device according to claim 1, wherein said first and second electrode substrates are configured not to have non-transparent members which block light transmitted through said opening.

6. The device according to claim 1, further comprising a backlight disposed behind said first electrode substrate.

7. The device according to claim 1, wherein said liquid crystal layer contains nematic liquid crystals, and said first and second electrode substrates are configured such that nematic liquid crystals are set into a twisted alignment.

8. The device according to claim 1, further comprising a circular polarizer which is provided commonly in said light reflective region and light transmissive region to perform optical switching in an electric field control birefringence manner.

9. The device according to claim 1, wherein said conductive light reflective film has undulation which diffuses reflected light, and said opening is mainly arranged at a dent portion of said conductive light reflective film.

10. The device according to claim 1, wherein said liquid crystal layer has a second cell gap set thicker than the first cell gap by 0.1 $\mu$m or more by said first and second electrode substrates in said light transmissive region.

11. The device according to claim 1, wherein at least one opening is arranged irregularly in said conductive light reflective film.

* * * * *